United States Patent
Hart et al.

(10) Patent No.: US 12,002,314 B2
(45) Date of Patent: Jun. 4, 2024

(54) AUTHENTICATION OF INTERNET OF THINGS DEVICES, INCLUDING ELECTRONIC LOCKS

(71) Applicant: ASSA ABLOY Americas Residential Inc., New Haven, CT (US)

(72) Inventors: James Creighton Hart, Huntington Beach, CA (US); Derek Imanuel, Anaheim, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 58 days.

(21) Appl. No.: 17/276,068

(22) PCT Filed: Sep. 13, 2019

(86) PCT No.: PCT/US2019/051033
§ 371 (c)(1),
(2) Date: Mar. 12, 2021

(87) PCT Pub. No.: WO2020/056272
PCT Pub. Date: Mar. 19, 2020

(65) Prior Publication Data
US 2022/0051498 A1 Feb. 17, 2022

Related U.S. Application Data

(60) Provisional application No. 62/731,417, filed on Sep. 14, 2018.

(51) Int. Cl.
*G07C 9/00* (2020.01)
*H04W 12/03* (2021.01)
(Continued)

(52) U.S. Cl.
CPC ..... *G07C 9/00571* (2013.01); *G07C 9/00309* (2013.01); *G07C 9/0069* (2013.01);
(Continued)

(58) Field of Classification Search
CPC ............ G07C 9/00309; G07C 9/00571; G07C 9/0069; H04W 12/50; H04W 12/03;
(Continued)

(56) References Cited

U.S. PATENT DOCUMENTS

2002/0078350 A1\* 6/2002 Sandhu ................. H04L 9/3297
713/168
2008/0209545 A1 8/2008 Asano
(Continued)

FOREIGN PATENT DOCUMENTS

| EP | 2903204 A1 \* | 8/2015 | ......... H04L 63/0869 |
| TW | 201329318 A | 7/2013 | |
| WO | 2018/011078 A1 | 1/2018 | |

OTHER PUBLICATIONS

What happens in a TLS handshake? | SSL handshake (Year: 2022).\*
International Search Report and Written Opinion for PCT/US2019/051033, dated Dec. 20, 2019.

*Primary Examiner* — Yong Hang Jiang
(74) *Attorney, Agent, or Firm* — Merchant & Gould P.C.

(57) ABSTRACT

Methods and systems for authenticating an Internet of Things device, such as an electronic lock, are disclosed. One method includes generating a first challenge at a server; transmitting the first challenge to the Internet of Things device; receiving a first signed certificate from the Internet of Things device, the first signed certificate being the first random number challenge signed with a private key associated with the internet of things device; and verifying the first signed certificate with the first challenge and a public key associated with the Internet of Things device. Mutual authentication of the server from the Internet of Things device is also provided.

20 Claims, 8 Drawing Sheets

(51) Int. Cl.
    *H04W 12/0431* (2021.01)
    *H04W 12/069* (2021.01)
(52) U.S. Cl.
    CPC ....... *H04W 12/03* (2021.01); *H04W 12/0431* (2021.01); *H04W 12/069* (2021.01); *G07C 2009/00388* (2013.01); *G07C 2009/00412* (2013.01)
(58) Field of Classification Search
    CPC . H04W 4/80; H04W 12/069; H04W 12/0431; H04L 63/0869; H04L 63/0823
    USPC .......................................................... 340/5.2
    See application file for complete search history.

(56) References Cited

U.S. PATENT DOCUMENTS

| | | |
|---|---|---|
| 2010/0293095 A1 | 11/2010 | Adkins et al. |
| 2012/0280789 A1 | 11/2012 | Gerhardt et al. |
| 2014/0292475 A1 | 10/2014 | Guo |
| 2017/0103647 A1* | 4/2017 | Davis .................. H04W 12/082 |
| 2017/0171607 A1 | 6/2017 | Britt |
| 2018/0183587 A1 | 6/2018 | Won et al. |
| 2018/0375852 A1* | 12/2018 | Thom ................. H04L 63/0272 |
| 2019/0052464 A1* | 2/2019 | Doliwa ................ H04L 9/3213 |
| 2019/0074980 A1* | 3/2019 | Loreskar ............... H04W 12/06 |
| 2019/0327098 A1* | 10/2019 | Hart ........................ E05B 45/06 |
| 2019/0334869 A1* | 10/2019 | Grant .................... H04L 67/141 |
| 2020/0259667 A1* | 8/2020 | Garnier .................. H04L 67/12 |
| 2020/0286135 A1* | 9/2020 | Matayoshi .............. G09F 3/204 |

\* cited by examiner

AUTHENTICATION OF INTERNET OF THINGS DEVICES, INCLUDING ELECTRONIC LOCKS

This application is a National Stage Application of PCT International patent application No. PCT/US209/051033, filed Sep. 13, 2019, which claims the benefit of priority to U.S. Provisional Patent Application No. 62/731,417, filed Sep. 14, 2018, which applications are incorporated herein by reference. To the extent appropriate, a claim of priority is made to each of the above-disclosed applications.

FIELD OF THE INVENTION

The present invention relates to an authentication of internet of things devices, including electronic locks.

BACKGROUND

Many Internet of Things devices require a data communication connection with a server in order to operate. For example, an electronic lock device needs to communicate with a cloud server to perform remote functions. However, not all Internet of Things (IoT) devices can establish a connection directly with a server through a network such as Wi-Fi. Such devices can communicate through other wireless networks such as Bluetooth with a mobile device or other computing device. The mobile device or computing device can, in turn, communicate with the cloud server over a wireless network such as Wi-Fi or mobile data.

However, such an arrangement has drawbacks. Communicating through a mobile device requires the use of an application. The application can be vulnerable to tampering. Therefore, it may not be safe for an Internet of Things device or a server to communicate with the mobile device application. There is a need for IoT devices to determine that information being passed through the application from a server is trusted, and vice versa.

The above issues are particularly of concern with respect to devices for which security is of particular concern such as wireless or connected electronic locks and related devices.

SUMMARY

The present disclosure relates generally to methods of authenticating access to a security device, such as an electronic lock, for use in a manner that ensures security of the security device as well as a device-server communication arrangement. In particular, the present disclosure describes methods and systems for authenticating exchange of information between an Internet of Things (IoT) device with a cloud server via a mobile device. A random number challenge is generated by the cloud and sent through the mobile device to the IoT device. A response to the challenge is sent via the mobile device back to the cloud where the response is verified against the original challenge and device public key. The response can be the challenge signed with a private key associated with the IoT device. This process improves the security of such IoT devices as electronic locks.

In a first aspect, a method of authenticating an Internet of Things device is provided. The method comprises: generating a first random number challenge at a server; transmitting the first random number challenge to the Internet of Things device; receiving a first response from the Internet of Things device; and verifying the first response with the first random number challenge and a public key associated with the Internet of Things device.

In a second aspect, a method of authenticating data communication between an electronic lock and a server is provided. The method comprises: generating a random number challenge at the electronic lock; transmitting the random number challenge to the server; receiving a response from the server; and verifying the response with the random number challenge and a public key associated with the server.

In yet another aspect, a method of authenticating data communication between an electronic lock and a cloud server is performed at a mobile device. The mobile device requests a first challenge from the electronic lock to authenticate the cloud server; the mobile device communicates the first challenge from the electronic lock to the cloud server; and the mobile device communicates a first signature result from the cloud server to the electronic lock. The mobile device requests a second challenge from the cloud server to authenticate the electronic lock; the mobile device communicates the second challenge from the cloud server to the electronic lock; and the mobile device communicates a second signature result from the electronic lock to the cloud server.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

Additionally, any examples set forth in this specification are not intended to be limiting and merely set forth some of the many possible embodiments for the claimed invention.

As briefly described above, embodiments of the present invention are directed to authentication between an Internet of Things device, such as a smart security device and a remote server. In example embodiments, the present disclosure relates to authentication of a smart security device, such as an electronic lock. The authenticating methodology described herein ensures that both the electronic lock and the remote server (cloud server) are from trusted sources.

In some embodiments, the cloud server issues a random number challenge that is sent to the lock. The lock signs the challenge with a lock private key and sends the resulting signature to the cloud server. The signature is verified against the original challenge and a lock public key. The lock can also generate a random number challenge to send to the cloud server. The cloud server then signs the challenge with its private key and sends the resulting signature back to the lock. The lock verifies the signature results against the original challenge and cloud server public key. The communication between the lock and the cloud server can take place directly if the lock is capable of connecting to a network such as a Wi-Fi network. Alternatively, if the lock cannot make a Wi-Fi connection, the lock can communicate with a network-enabled device such as a mobile device. The network-enabled device, in turn, communicates with the cloud server through a network such as a Wi-Fi network or mobile data network.

In example aspects, various wireless protocols can be used. In example embodiments, a Wi-Fi protocol (802.11x) may be used to connect the electronic lock to a server (cloud) device, while a different wireless protocol (e.g., Bluetooth, including Bluetooth Low Energy, or BLE) used for short-range communication between the electronic lock and other devices, such as a mobile device may be used to actuate the lock. In other embodiments, various other wireless protocols can be used, such as other short- or long-range wireless protocols (e.g., cellular, RFID/NFC, Zigbee, Z-wave, etc.).

The term "lock" or "lockset" is broadly intended to include any type of lock, including but not limited to deadbolts, knob locks, lever handle locks, mortise locks and slide locks, whether mechanical, electrical or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to deadbolts, knobset locks, handleset locks, etc. Still further, example aspects of the present application can be applied to other types of IoT devices for which security is an issue, e.g., wireless/interconnected home devices that store user data.

Figure 1:
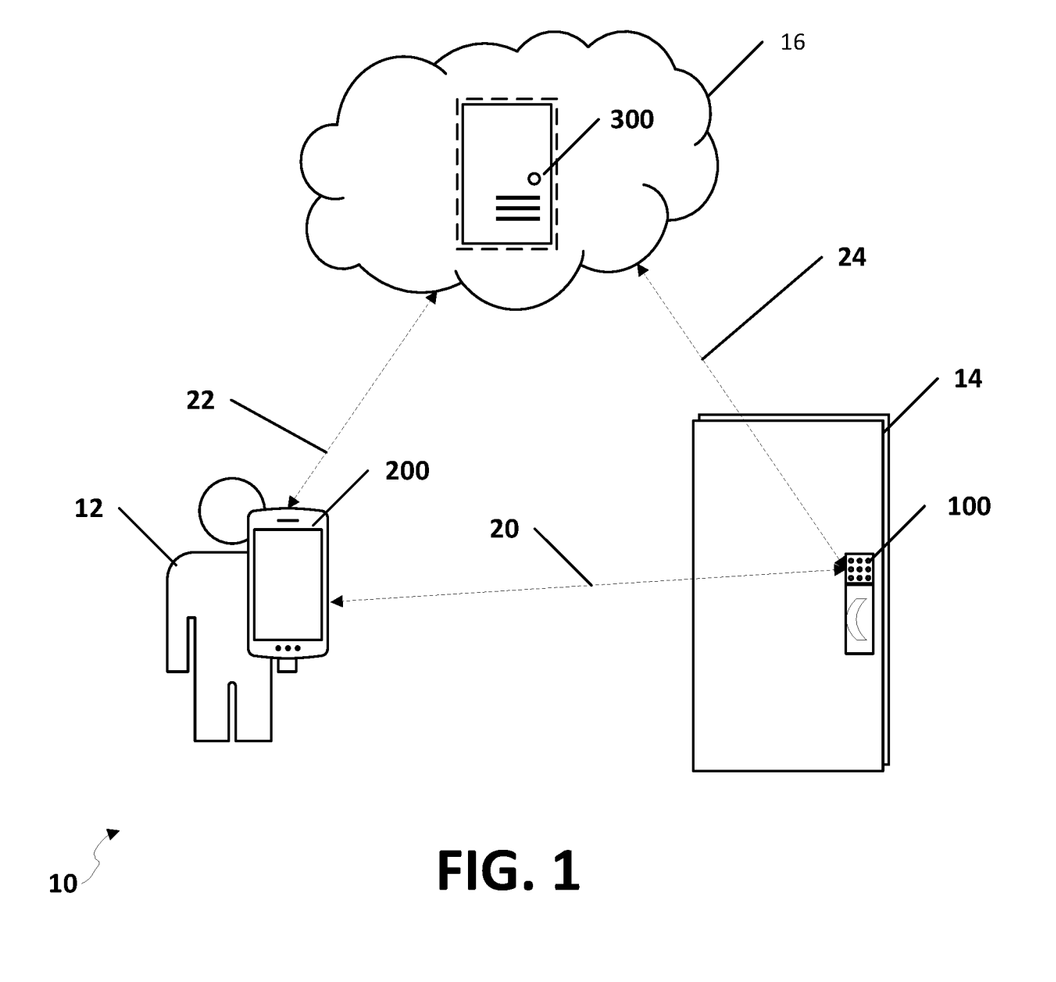
FIG. 1 illustrates an environment in which aspects of the present disclosure may be implemented.

FIG. 1 illustrates an environment 10 in which aspects of the present disclosure may be implemented. A user 12 has a phone or other mobile device 200 with wireless communication capabilities. The user 12 is an authorized person desiring to unlock (or lock) a door 14. The door 14 includes an electronic lock 100 (also referred to as a wireless electronic lockset). The mobile device 200 is capable of communicating 22 with a server 300 and communicating 20 with the electronic lock 100. The server 300 can be, for example a physical server, or a virtual server hosted in a cloud storage environment 16. In some embodiments, the electronic lock 100 is also capable of communicating 24 with the server 300. Such communication can optionally occur via one or more wireless communication protocols, e.g., Wi-Fi (IEEE 802.11), short-range wireless communication to a Wi-Fi bridge, or other connection mechanism. The server 300 generally authenticates the electronic lock 100 before establishing a secure connection. Alternatively, the electronic lock 100 can authenticate the server 300 to establish a secure connection. In some instances, the server 300 and the lock 100 operate to mutually authenticate each other in order to provide a higher level of security when establishing a connection.

I. Electronic Lock Components and In-Use Operation

Figure 2:
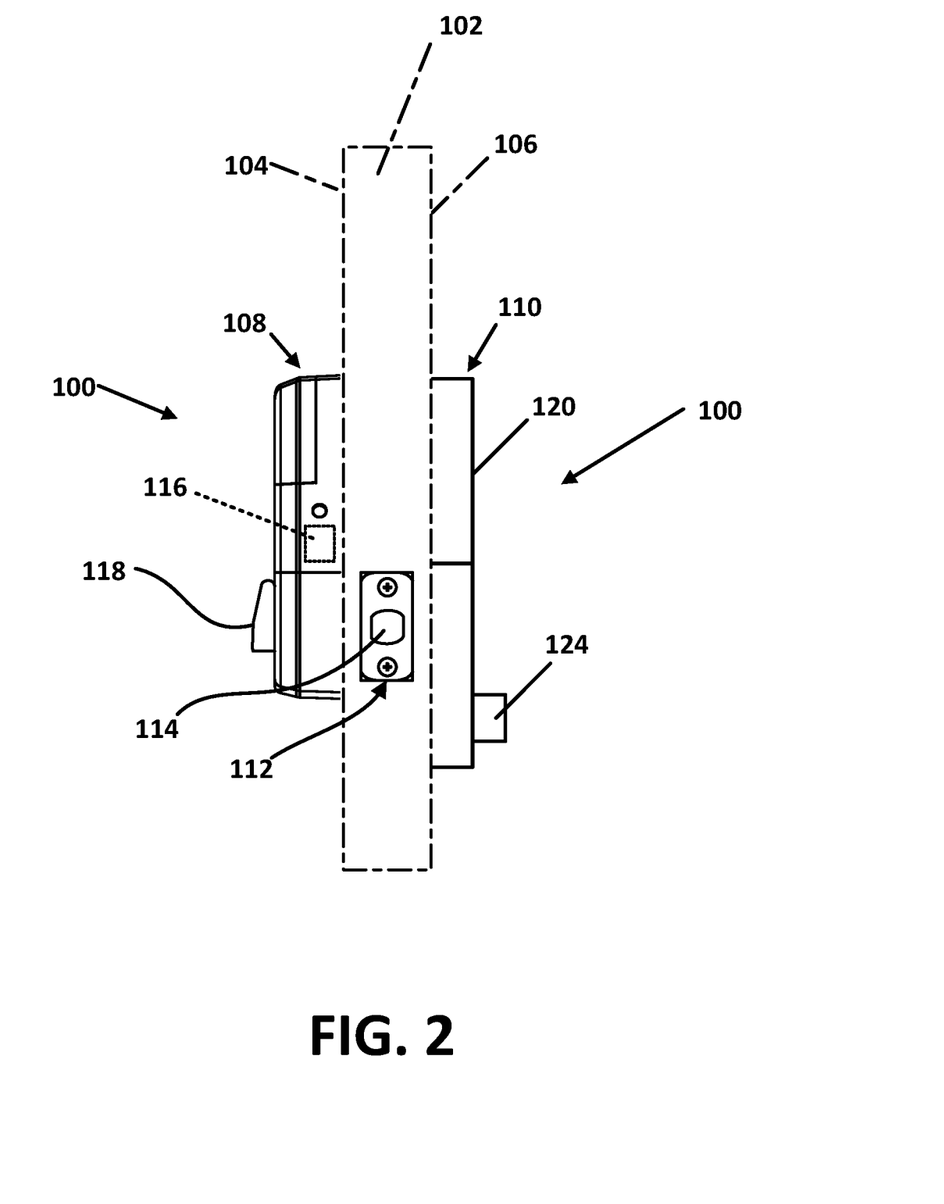
FIG. 2 illustrates a side view of a portion of the electronic lock of FIG. 1.
Figure 3:
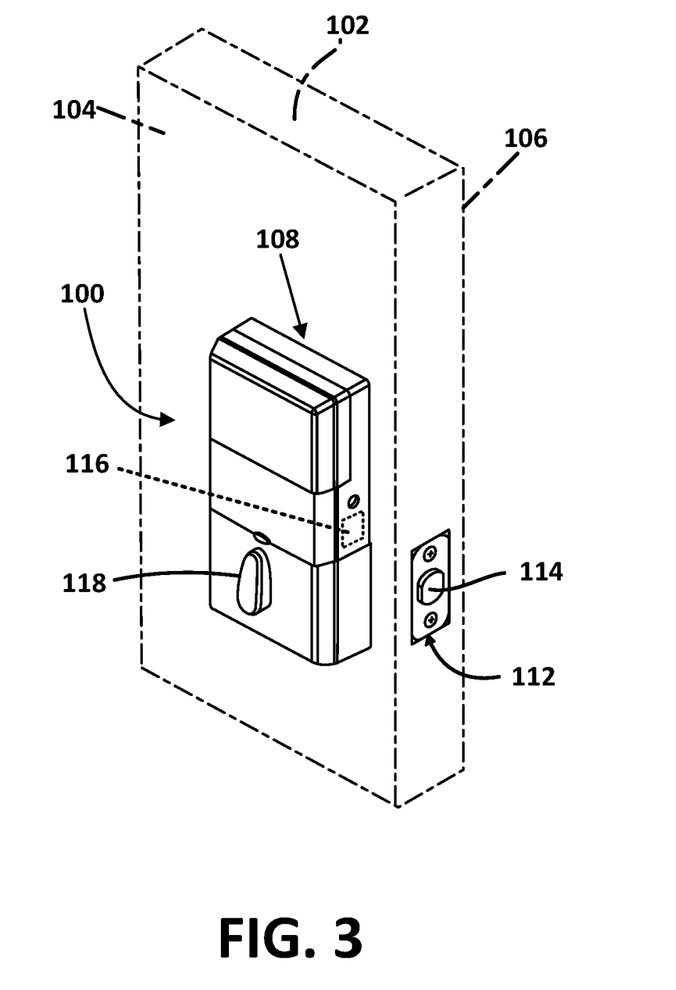
FIG. 3 illustrates a rear perspective view of a portion of the electronic lock of FIG. 1.
Figure 4:
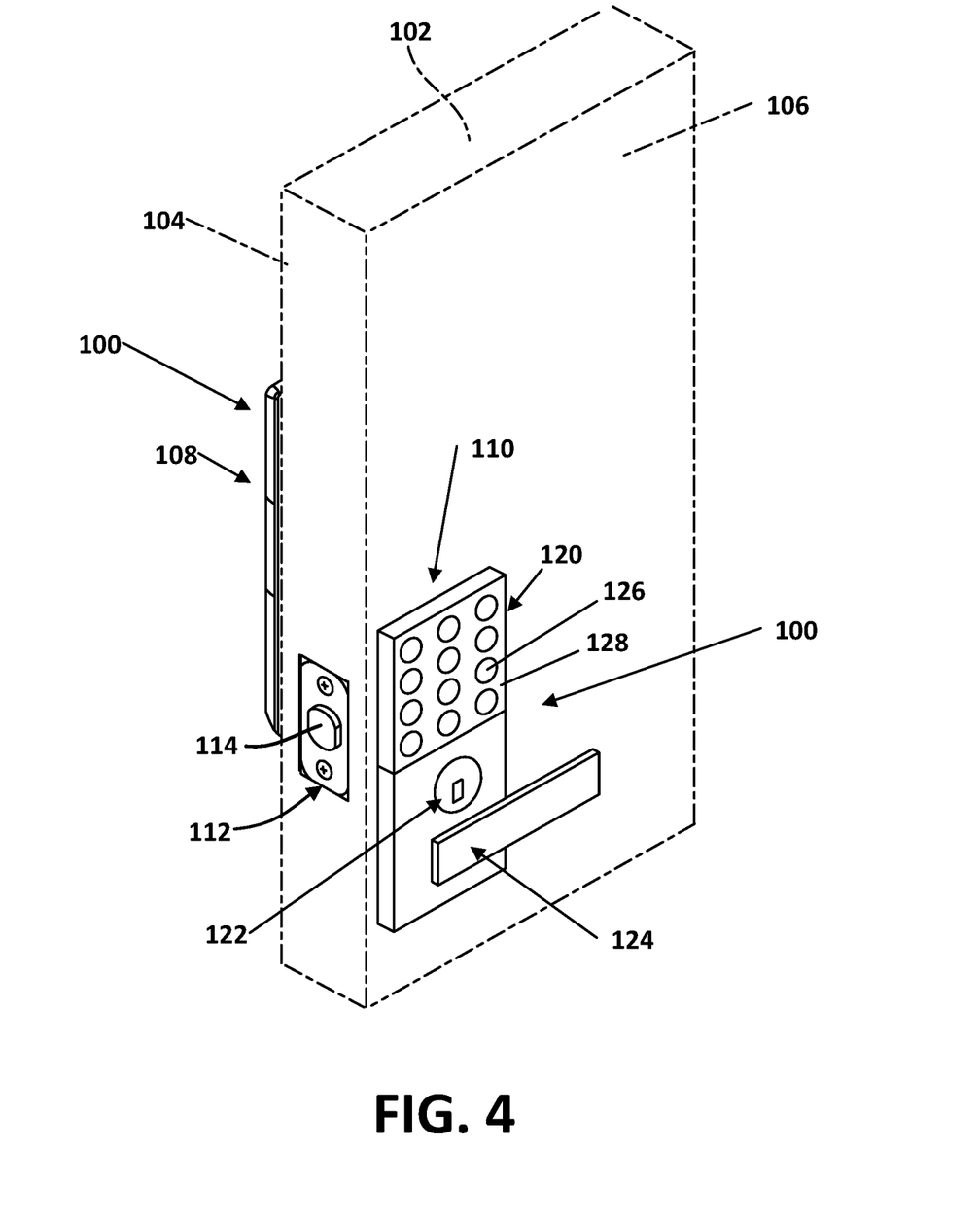
FIG. 4 illustrates a front perspective view of a portion of the electronic lock of FIG. 1.

FIGS. 2-4 illustrate an electronic lock 100 as installed at a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device and may be embodied as a standalone unit or as a device shared with components of the electronic lock 100.

The processing unit 116 may include memory communicatively interfaced to the processor, for storing the software instructions. Alternatively, or the electronic lock 100 may further comprise a separate memory device for storing the software instructions that is electrically connected to the processing unit 116 for the bi-directional communication of the instructions, data, and signals therebetween.

Referring to FIG. 4, the exterior assembly 110 can include exterior circuitry 117 (see FIG. 5) communicatively and electrically connected to the processing unit 116. For example, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 102. When the user inputs a valid code via keypad 120 that is recognized by the processing unit 116, an electrical motor is energized to retract the bolt 114 of latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700, which is hereby incorporated by reference in its entirety.

In alternative embodiments, one or more other types of user interface devices could be incorporated into the electronic lock 100. For example, in example implementations, the exterior assembly 110 can include a biometric interface (e.g., a fingerprint sensor, retina scanner, camera including facial recognition), or an audio interface by which voice recognition could be used to actuate the lock. Still further, other touch interfaces may be implemented, e.g., where a single touch may be used to actuate the lock rather than requiring entry of a specified code.

Figure 5:
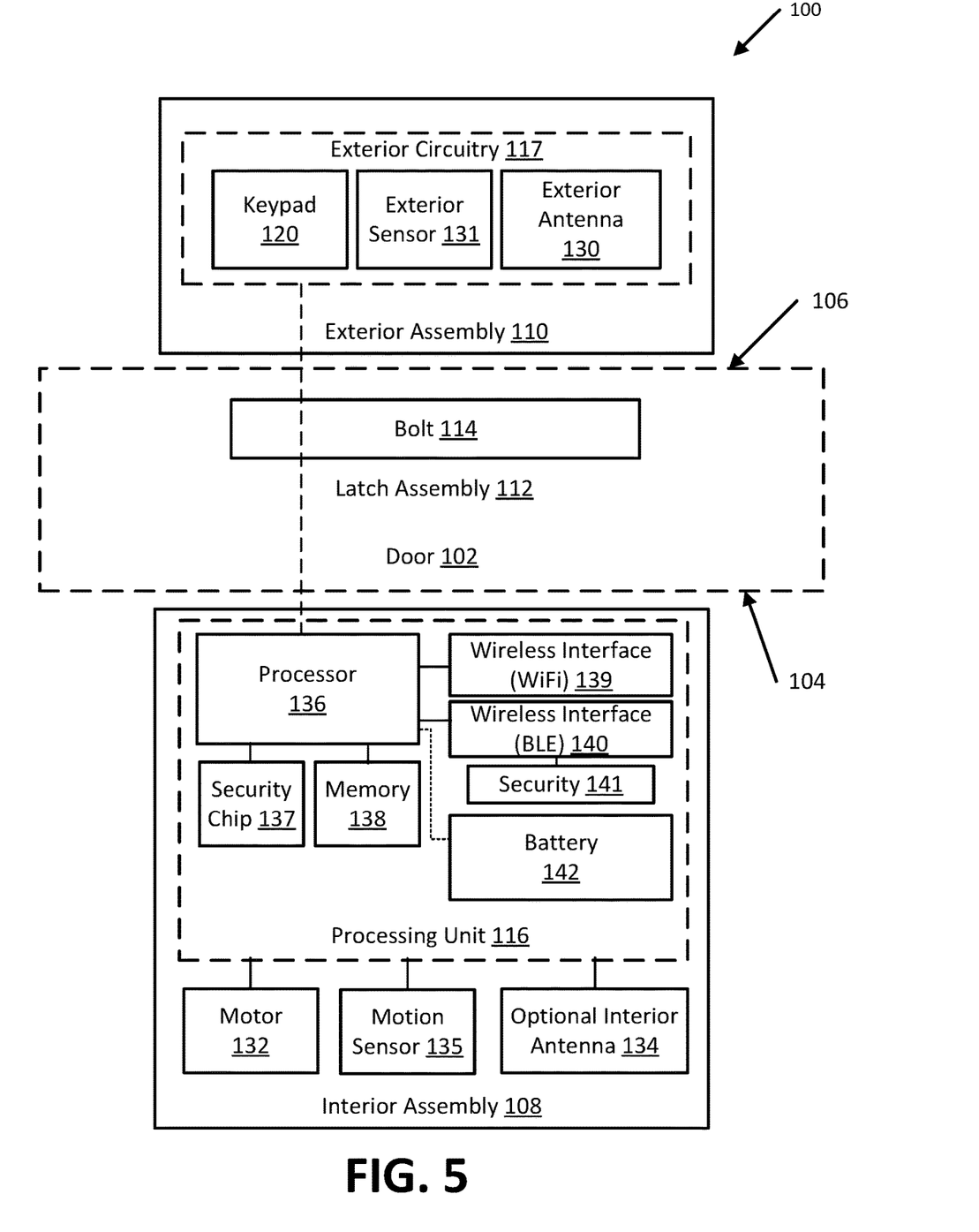
FIG. 5 illustrates a schematic representation of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 102 can be sensed. In response to such sensed conditions, notifications may be sent by the electronic lock 100 to a server 300 or mobile device 200, including information associated with the sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device 200 determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid code) or from an application installed on the mobile device 200. In such arrangements, because touch alone at the exterior of the door cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and Bluetooth interface 140), and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, interior antenna 134, or motion sensor 135 (e.g., a vibration sensor, gyroscope, accelerometer, motion/position sensor, or combination thereof) and can validate received signals in order to actuate the lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information usable to generate a certificate usable to validate the electronic lock 100 with a remote system, such as the server 300 or mobile device 200. In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with the server 300 or mobile device 200, or operate at all, in some cases. Details regarding configuration of an electronic lock 100 to include security features, including authenticating communications between the electronic lock and a cloud server, are provided below.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and Bluetooth interface 140. Interfaces for other types of wireless communication can be used in addition to or instead of Wi-Fi and Bluetooth. For example, a Thread interface could be included with the processing unit 116. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200 and server 300 via the Wi-Fi interface, and can communicate with the mobile device 200 when the mobile device is in proximity to the electronic lock 100 via the Bluetooth interface 140. In some embodiments, the processing unit 116 is configured to communicate with the mobile device 200 via the Bluetooth interface 140, and communications between the mobile device 200 and electronic lock 100 when the mobile device 200 is out of range of Bluetooth wireless signals can be relayed via the server 300, e.g., via the Wi-Fi interface 139.

Of course, in alternative embodiments, other wireless protocols could be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user of a mobile device 200 may access an account associated with the electronic lock 100 to view and modify settings of that lock, which are then propagated from the server 300 to the electronic lock 100. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example a cryptographic circuit capable of storing cryptographic information and generating encryption keys usable to generate certificates for communication with other systems, e.g., mobile device 200.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 200. In some examples, only a mobile device determined to be located on the exterior side 106 of the door 102 is able to unlock (or lock) the door 102. This prevents unauthorized users from being located near the electronic lock 100 and taking advantage of an authorized mobile device that may be located on the interior side 104 of the door 102, even though the authorized mobile device is not being used to unlock the door 102. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100.

Of course, in alternative embodiments, other lock actuation sequences may not require use of a motion sensor 135. For example, if the mobile device 200 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

Figure 6:
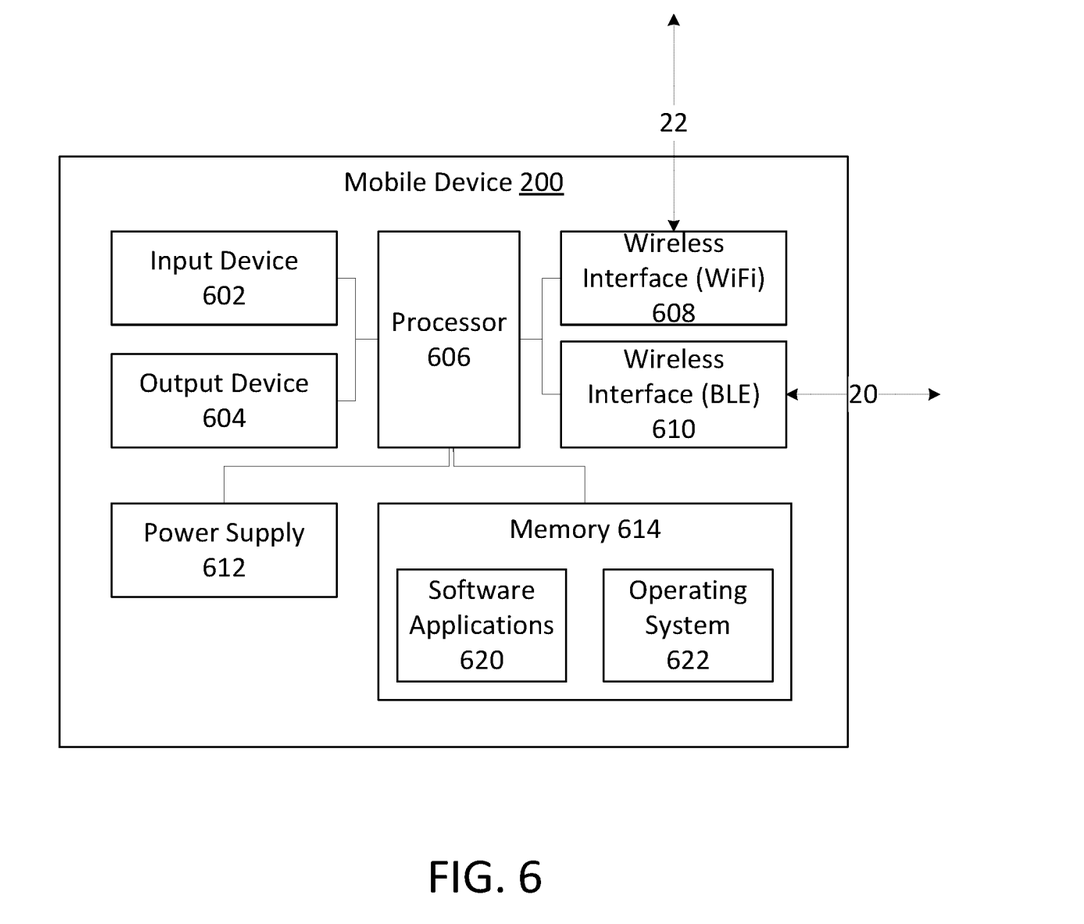
FIG. 6 illustrates a schematic representation of the mobile device of FIG. 1.

FIG. 6 illustrates a schematic diagram of a mobile device 200 usable in embodiments of the disclosure to authenticate an IoT device with a cloud server. In some embodiments, the mobile device 200 operates to form a Bluetooth or BLE connection with a network enabled security device such as an electronic lock. The mobile device 200 then communicates with a cloud server via a Wi-Fi or mobile data connection. The mobile device 200 thus operates to communicate information between the lock and the server. In other embodiments, the mobile device 200 is not required because the IoT device is network enabled such that it can connected via Wi-Fi to the cloud server. The mobile device 200 shown in FIG. 6 includes an input device 602, an output device 604, a processor 606, a wireless Wi-Fi interface 608, a wireless BLE interface 610, a power supply 612, and a memory 614.

The input device 602 operates to receive input from external sources. Such sources can include inputs received from a user. The inputs can be received through a touchscreen, a stylus, a keyboard, etc.

The output device 604 operates to provide output of information from the mobile device 200. For example, a display could output visual information while a speaker could output audio information.

The processor 606 reads data and instructions. The data and instructions can be stored locally, received from an external source, or accessed from removable media.

The wireless interface 608 is similar to the wireless interface 139. A Wi-Fi connection 22 $_{[AS1]}$can be established with the cloud server 300.

The wireless interface 610 is similar to the wireless interface 140. A BLE connection 20 $_{[AS2]}$be established with the electronic lock 100.

The power supply 612 provides power to the processor.

The memory 614 includes software applications 620 and an operating system 622. The memory 614 contains data and instructions that are usable by the processor to implement various functions of the mobile device 200.

The software applications 620 can include applications usable to perform various functions on the mobile device 200. One such application is an Internet of Things application. The Internet of Things application can operate to access and control devices that are connected to the mobile device through a network.

Figure 7:
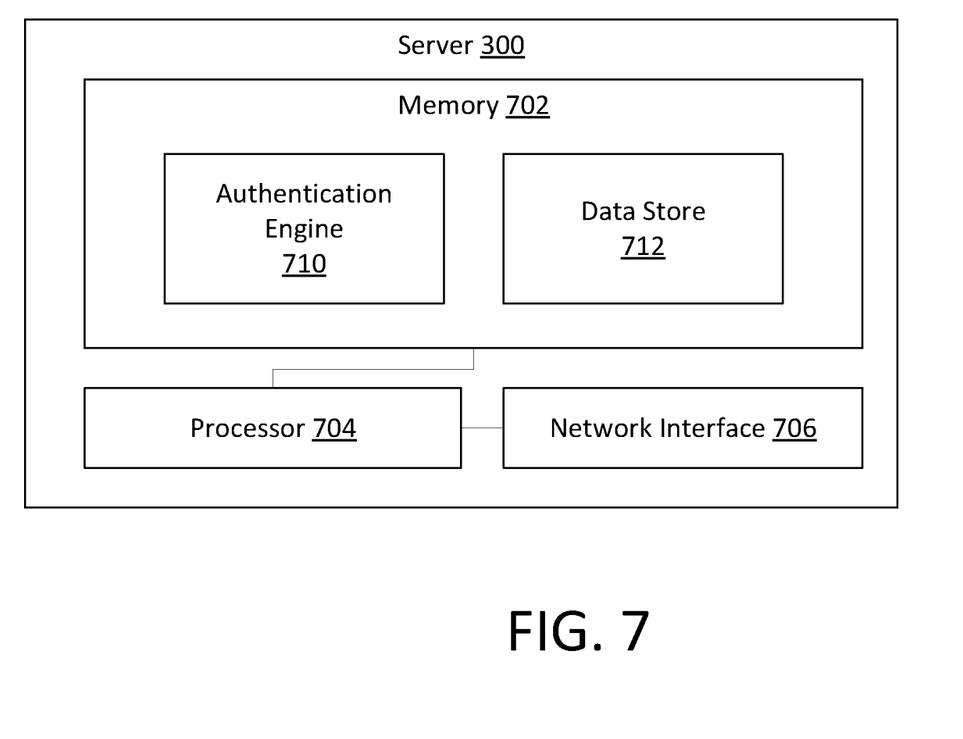
FIG. 7 illustrates a schematic representation of the cloud server of FIG. 1.

FIG. 7 illustrates a schematic diagram of a server 300 usable in embodiments of the disclosure to authenticate an IoT device. The server 300 can be owned and maintained by a manufacturer of an Internet of Things device that needs to be authenticated before use, or can be a virtual server provided by a cloud hosting service to such a manufacturer for use. The server 300 includes a memory 702, a processor 704, and a network interface 706.

The memory 702 includes an authentication engine 710 and a data store 712.

The authentication engine 710 operates to generate challenges, verify signature results, and send authentication results. The function of the authentication engine 710 is further described in the method of FIG. 8.

The data store 712 functions to store information needed to authenticate IoT devices. This information can include account information for users of IoT devices. The account information can be gathered through input received at the mobile device 200, for example. The data store 712 also stores keys used to sign challenges that are sent to IoT devices and to validate signatures received from an Internet of Things device. The keys can include public keys and private keys.

The processor 704 operates to execute instructions stored on the memory 702.

The network interface 706 operates to establish connections with Internet of Things devices such as an electronic lock 100 as well as mobile device 200 via a network connection such as Wi-Fi.

II. Electronic Lock Authentication

Figure 8:
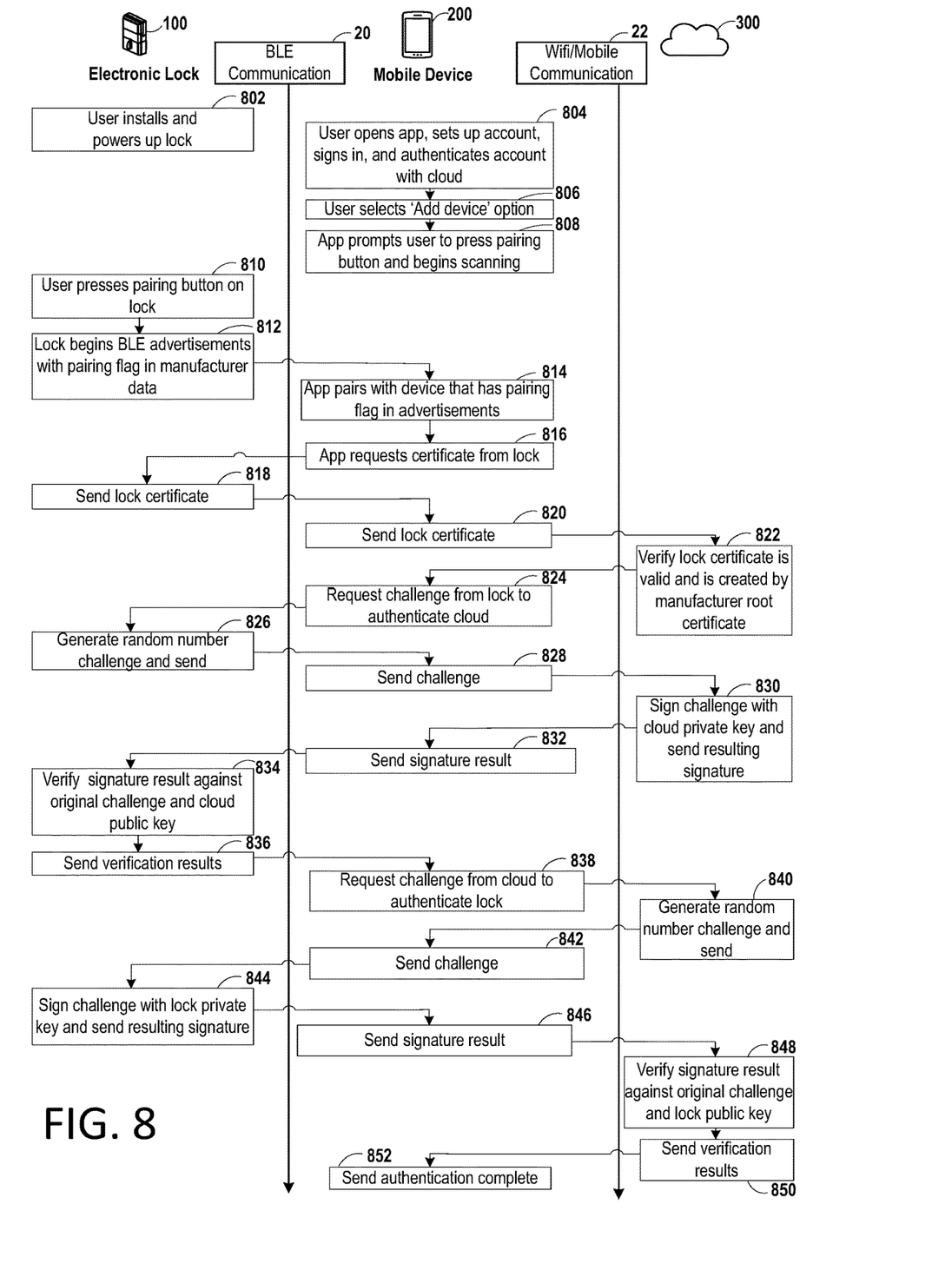
FIG. 8 is a flowchart of an example method of authenticating an electronic lock, in accordance with example aspects of the present disclosure.

Referring now to FIG. 8, methods and systems for authenticating an IoT device with a cloud server are disclosed. The methods and systems described herein provide a method of ensuring that any information exchanged over a network between a server and an IoT device, such as an electronic lock, is secure. FIG. 8 provides a method of authenticating an electronic lock with a cloud server using a mobile device. In alternative embodiments, authentication can be performed using communication directly between the electronic lock and the cloud server.

FIG. 8 is a flow chart illustrating a method of associating an electronic lock with a user account at a cloud server 300, as well as authenticating an electronic lock 100 with a cloud server 300 to ensure that communications are secure. This is accomplished using BLE communication 20 between the electronic lock 100 and the mobile device 200. The mobile device 200, in turn, communicates with the cloud server 300 with Wi-Fi or mobile communication 22. In alternative embodiments, different wireless communication methods can be utilized.

At operation 802, the electronic lock is installed and powered on. In some instances, the lock may be installed by someone other than the ultimate user of the lock. The user of the electronic lock is also the user of the mobile device 200 in this example.

At operation 804, the user opens an application on the mobile device 200. The application can be an IoT application 626 stored with the software applications 620 described in FIG. 6. In some embodiments, the application 626 will prompt the user to set up an account that is managed by the owner of the cloud server 300. The user will set up the account by providing some identifying information and establishing login information. In some embodiments, the account can be utilized to access and control multiple IoT devices including the electronic lock 100. Once the user has set up an account, the account is authenticated with the cloud server 300.

At operation 806, the application 626 on the mobile device 200 receives input from the user to add a new device to the account. In this example, the user is adding the electronic lock 100 to the user's account. The application 626 may prompt the user to provide some identifying information about the device, such as a type of device or a model number. The application 626 may request that the user scan a code on the electronic lock 100 with the mobile device 200, e.g., to obtain a unique identifier of the model or the specific device to be added to the user's account.

At operation 808, the application 626 prompts the user to pair the electronic lock with the mobile device 200. In some embodiments, the application 626 will instruct the user to press a button on the electronic lock 100 that will activate BLE to search for new connections. At the same time, the mobile device 200 will also begin to scan for available BLE devices in the vicinity.

At operation 810, the user presses a pairing button on the electronic lock 100. At operation 812, the lock 100 enters an advertising mode. In the advertising mode, BLE advertising packets are periodically transmitted by the wireless BLE interface 140 of the electronic lock 100. The BLE advertisements include a pairing flag that is contained within the manufacturer specific data part of the advertisement packets.

At operation 814, the mobile device 200, which remains in the vicinity of the electronic lock 100, recognizes the pairing flag in the advertisements. The mobile device 200 (e.g., via application 626) then connects and pairs to the lock via the BLE connection.

At operation 816, the mobile device 200 (e.g., via the application 626) communicates via Bluetooth to request a certificate from the lock 100.

At operation 818, the lock 100 sends a lock certificate 818 back to the mobile device 200. The lock certificate can be, for example, a certificate generated at the lock based on information stored at the lock. For example, the lock can store, or generate, a certificate based on a manufacturer root certificate that can be validated by a server having knowledge of the manufacturing root certificate.

At operation 820, the mobile device 200 sends the lock certificate to the server 300.

At operation 822, the server 300 verifies that the lock certificate is valid. In some embodiments, the authentication engine 710 of FIG. 7 operates to validate the lock certificate. The validating process ensures that the certificate is associated with a lock or other device that is from a trusted source. In some embodiments, the authentication engine 710 verifies that the lock certificate was created by a manufacturer root certificate that matches the manufacturer that produced the lock and operates the server 300.

At this point, data communication is authorized between the lock 100 and the cloud server 300 through the mobile device 200. If the certificate is found to be invalid, the BLE connection between the lock 100 and the mobile device 200 will be disconnected and the pairing will be removed. Before any sensitive information is communicated or before any actions at the lock can be executed, it is desirable to further authenticate the identity of the lock and the server. This ensures that a user's account and connected IoT devices are only accessible by authorized users. The connection between the mobile device 200 and the lock 100 as well as between the mobile device 200 and the cloud server 300 are authenticated to ensure secure data communication.

In the example shown, the electronic lock 100 is now associated with the mobile device 200 and cloud server 300. Accordingly, for subsequent communication between the electronic lock 100 and cloud server 300, a mutual authentication process can be performed. In general, the mutual authentication process is performed by having the lock authenticate the cloud server as being a trusted system (operations 824-836), and having the cloud server 300 authenticate the electronic lock 100 as a trusted system (operations 838-850). It is noted that the order in which authentication occurs (cloud authentication of lock and then lock authentication of cloud) is interchangeable in various embodiments.

In the specific example shown, the method continues at operation 824, where the mobile device 200 requests a challenge from the electronic lock 100 to authenticate the cloud server 300.

At operation 826, the electronic lock 100 generates a random number challenge. This random number challenge is sent in a token to the mobile device 200.

At operation 828, the mobile device 200 receives the challenge and then sends it on to the cloud server 300 via Wi-Fi or mobile communication 22.

At operation 830, the cloud server 300 receives the challenge. The challenge is signed with a private key specific to the server. The signing can take place at the authentication engine 710. The resulting signed challenge can be sent back to the mobile device 200.

At operation 832, the signed challenge result is received at the mobile device 200 and then sent on to the electronic lock 100 (e.g., via a Bluetooth connection, such as BLE).

At operation 834, the signed challenge is received at the lock 100 for verification. The verification process can take place at the processor 136. The signed challenge is verified against the original challenge issued by the lock 100 by using a cloud server public key obtained by the electronic lock 100.

At operation 836, the results of the verification are sent from the electronic lock 100 to the mobile device 200.

In the embodiment shown, the method proceeds to operation 838 (assuming successful authentication of the cloud server 300 by the electronic lock 100). If not, the connection between the electronic lock 100 and the cloud server 300 will be disconnected due to an invalid signature being received at the electronic lock 100. The signature may be invalid if the signature result does not match the original challenge or the public key does not match that of the server operator. In other words, if decryption of the challenge using the cloud server's public key at the electronic lock 100 does not result in a match between the sent and received challenge, the signature result would not indicate that the server is trusted, the connection will discontinue.

Referring now to operations 838-850, authentication of the electronic lock 100 by the cloud server 300 is performed, e.g., via the mobile device 200. At operation 838, the mobile device 200 requests a challenge from the cloud server 300 in order to authenticate the electronic lock 100.

At operation 840, the cloud server 300 generates a random number challenge. This step can be performed by the authentication engine 710 of the cloud server 300. The random number challenge is sent from the cloud server 300 to the mobile device 200.

At operation 842, the mobile device 200 sends the challenge on to the electronic lock 100.

At operation 844, the electronic lock 100 receives and signs the challenge. A private key specific to the electronic lock 100 is accessed at the security chip 137 of the lock and is used to sign the challenge. The resulting signature (e.g., the signed challenge) is communicated to the mobile device 200 via BLE communication 20.

At operation 846, the signed challenge is received at the mobile device 200 (e.g., via Bluetooth connection, such as BLE) and then sent to the cloud server 300.

At operation 848, the signed challenge is received at the cloud server 300. The authentication engine 710 verifies the signed challenge received from the electronic lock 100 against the original random number challenge using the lock's public key. The public key of the electronic lock 100 can be obtained by the server during original configuration and provisioning of the electronic lock. An example process for exchange of public keys between the electronic lock 100 and the cloud server 300 is described in U.S. patent application Ser. No. 16/392,816, filed Apr. 24, 2019[AS3], entitled "Secure Provisioning of Internet of Things Devices, Including Electronic Locks", the disclosure of which is hereby incorporated by reference in its entirety.

At operation 850, the results of the verification are sent from the cloud server 300 to the mobile device 200. If the signature result is verified in operation 848, the results will indicate that there is a secured communication channel established through the application operating on the mobile device.

At operation 852, a communication is sent from the cloud server 300 to the mobile device 200 indicating that authentication is complete.

Referring to FIG. 8 generally, it is noted that in the embodiment shown, data exchange between the electronic lock 100 and the cloud server 300 is performed using the mobile device 200 as a conduit. However, in other embodiments, the method of authentication can occur by direct communication between the electronic lock 100 and the cloud server 300. The electronic lock 100 can communicate with the cloud server 300 through a Wi-Fi or mobile data network 22 [AS4]without using the mobile device 200 as a conduit. For example, the electronic lock 100 may transmit the lock certificate, challenge, verification results, and signed server challenge directly to the server 300, and the server 300 may send the signed device challenge, the server challenge, and verification results directly to the electronic lock 100.

Upon completion of authentication, the electronic lock 100 may receive commands from either the cloud server 300 or the mobile device 200, since each will be trusted by the electronic lock. For example, the mobile device 200 or cloud server 300 may instruct the electronic lock to be actuated between locked and unlocked positions, may change one or more security settings, may provide a status or history of the lock, or other actions.

Referring to FIGS. 1-8 generally, the methods and systems described above provide advantages over existing solutions for authenticating communications between IoT devices and remote servers. The methods of authentication enable a secure data communication connection to be formed between an IoT device and a remote server. Each of the IoT device and the server issue challenges that must be signed by the other in order to establish the secure connection. In embodiments where a mobile device running an application is used to communicate between the IoT device and the server, the IoT device and server can determine that the information being received from the other is trusted even if the mobile device application is not.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of authenticating an Internet of Things device comprising:
    verifying a device certificate received from the Internet of Things device is valid and created based on a root certificate associated with a manufacturer of the Internet of Things device;
    after verifying the device certificate, generating a first challenge at a server;
    transmitting the first challenge to the Internet of Things device;
    receiving a first response from the Internet of Things device, the first response being signed with a private key of the Internet of Things device; and
    verifying the first response with the first challenge and a public key associated with the Internet of Things device,
    wherein secured data communication between the Internet of Things device and the server is enabled based at least in part on successful verification of the device certificate and the first response.

2. The method of claim 1, further comprising:
    receiving a second challenge from the Internet of Things device;
    responding to the second challenge to produce a second response, the second response being signed with a private key of the server;
    transmitting the second response to the Internet of Things device; and
    receiving confirmation of authentication from the Internet of Things device.

3. The method of claim 1, wherein the Internet of Things device is an electronic lock.

4. The method of claim 1, wherein the transmitting occurs via a mobile device in data communication with both the Internet of Things device and the server.

5. The method of claim 4, wherein the mobile device is in data communication with the Internet of Things device via a Bluetooth connection.

6. The method of claim 4, wherein the mobile device is in data communication with the server via a Wi-Fi connection.

7. The method of claim 1, wherein the transmitting occurs directly between the Internet of Things device and the server via a wireless network connection.

8. The method of claim 1, further comprising:
    before generating the first challenge, receiving an authentication request from a mobile device, the mobile device being associated with a user account; and
    authenticating and establishing a data connection with the mobile device, the mobile device also being in data communication with the Internet of Things device.

9. The method of claim 8, wherein the device certificate received from the Internet of Things device is validated at the server against a certificate issued by the manufacturer of the Internet of Things device.

10. The method of claim 1, wherein the first challenge comprises a first random number challenge.

11. The method of claim 1, wherein the first response is the first challenge signed with the private key associated with the Internet of Things device.

12. The method of claim 2, wherein the second response is the second challenge signed with the private key associated with the server.

13. A method of authenticating data communication between an electronic lock and a server comprising:
generating, at the electronic lock, a lock certificate based at least in part on a manufacturer root certificate of a manufacturer of the electronic lock;
transmitting the lock certificate to the server;
after the lock certificate is verified at the server, generating a random number challenge at the electronic lock;
transmitting the random number challenge to the server;
receiving a signed certificate from the server, the signed certificate being based on the lock certificate and signed with a private key associated with the server;
verifying the signed certificate with the random number challenge and a public key associated with the server;
signing a second random number challenge received from the server at the electronic lock; and
transmitting the signed second random number challenge to the server, wherein the signed second random number challenge is verified at the server;
wherein secured data communication between the electronic lock and the server is enabled based at least in part on successful verification of the lock certificate, the signed certificate, and the signed second random number challenge.

14. The method of claim 13, wherein transmitting the random number challenge to the server comprises transmitting the random number challenge to a mobile device for forwarding to the server.

15. The method of claim 13, wherein verifying the signed certificate comprises decrypting the signed certificate using a public key of the server at the electronic lock.

16. A method of authenticating data communication between an electronic lock and a cloud server comprising:
receiving, at a mobile device, a lock certificate from the electronic lock, the lock certificate being based at least in part on a manufacturer root certificate of a manufacturer of the electronic lock;
transmitting the lock certificate from the mobile device to the cloud server;
at the mobile device, requesting a first challenge from the electronic lock to authenticate the cloud server;
communicating, with the mobile device, the first challenge from the electronic lock to the cloud server;
communicating, with the mobile device, a first signature result from the cloud server to the electronic lock, the first signature result being signed with a private key of the cloud server;
at the mobile device, requesting a second challenge from the cloud server to authenticate the electronic lock;
communicating, with the mobile device, the second challenge from the cloud server to the electronic lock; and
communicating, with the mobile device, a second signature result from the electronic lock to the cloud server, the second signature result being signed with a private key of the electronic lock,
wherein secured data communication between the electronic lock and the cloud server is enabled based at least in part on successful verification of the lock certificate, the first signature result, and the second signature result.

17. The method of claim 16, wherein, based on the first signature result and the second signature result, communication is enabled between the electronic lock and the cloud server.

18. The method of claim 17, wherein, upon authenticating the cloud server at the electronic lock and authenticating the electronic lock at the cloud server, the electronic lock is enabled to communicate with the cloud server via a Wi-Fi connection without requiring intermediation by the mobile device.

19. An electronic lock comprising:
a latch movable between a locked position and an unlocked position;
a motor operatively connected to the latch and configured to drive the latch between the locked position and the unlocked position;
at least one wireless communication interface; and
a programmable circuit configured to selectively actuate the motor and communicate with a server regarding a status of the electronic lock, the programmable circuit configured to perform an authentication process comprising:
generating, at the electronic lock, a lock certificate based at least in part on a manufacturer root certificate of a manufacturer of the electronic lock;
transmitting the lock certificate to the server;
after the lock certificate is verified at the server, generating a random number challenge at the electronic lock;
transmitting the random number challenge to the server via the at least one wireless communication interface;
receiving a signed certificate from the server, the signed certificate being based on the lock certificate and signed with a private key associated with the server;
verifying the signed certificate with the random number challenge and a public key associated with the server;
signing a second random number challenge received from the server at the electronic lock; and
transmitting the signed second random number challenge to the server, wherein the signed second random number challenge is verified at the server;
wherein secured data communication between the electronic lock and the server is enabled based at least in part on successful verification of the lock certificate, the signed certificate, and the signed second random number challenge.

20. The electronic lock of claim 19, wherein, upon completion of the authentication process, the electronic lock is enabled to receive a command from the server to actuate the motor and drive the latch between the locked position and the unlocked position.

* * * * *